Reissued Sept. 17, 1935

Re. 19,705

UNITED STATES PATENT OFFICE 19,705

CELLULOSE DERIVATIVE COMPOSITION

Emmette F. Izard, Elsmere, Del., assignor to E. I. du Pont de Nemours & Company, Wilmington, Del., a corporation of Delaware No Drawing. Original No. 1,943,972, dated January 16, 1934, Serial No. 612,627, May 20, 1932. Application for reissue April 18, 1934, Serial No. 721,224

13 Claims. (Cl. 106—37)

This invention relates to cellulose derivative compositions, and more particularly, to improved cellulose derivative compositions containing new plasticizers.

An object of the present invention is to add to the known plasticizers for cellulose derivatives a new group of compounds having high compatibility with cellulose derivatives, extremely high boiling points and low vapor pressures, and other advantageous properties. A further object is to provide cellulose derivative compositions which will give films of great durability and substantially permanent flexibility. Other objects will be apparent from the description given hereinafter.

The above objects are accomplished according to the present invention by the use of esters of monoaryl ethers of polyglycols with organic or inorganic acids as plasticizers for cellulose derivatives.

Only a few monoaryl ethers of polyglycols and esters thereof have been prepared heretofore. These compounds may be conveniently prepared by reacting phenol and substituted phenols with dichlorodiethylether in the presence of sodium hydroxide to give phenoxyethoxyethyl chloride and similar compounds. By reacting the chlorides with the sodium salts of carboxylic acids, esters of the organic acids may be prepared, and by reacting the chlorides with alkalies, the corresponding free alcohol may be prepared. The free alcohol may also be obtained by hydrolysis of the esters formed by reacting the sodium salts of organic acids with the chlorides of the aryloxyethoxyethanols. Organic esters may also be prepared by esterifying the free alcohol with any carboxylic acid, such as monocarboxylic acids of the fatty acid series from acetic to stearic acid, or with polycarboxylic acids such as phthalic, adipic, sebacic, trimesic, tartaric, citric, and the like, or with other acids such as benzoylbenzoic and substituted benzoylbenzoic acids.

The present invention is not directly concerned with the preparation of these compounds, but the following examples are given to illustrate the preparation of a few of the compounds forming the novel plasticizers of the present invention:

*Example 1. Phenoxyethoxyethyl chloride.*—A mixture containing 188 g. phenol, 84 g. sodium hydroxide, and 200 g. xylene is heated to 135° C. and then added to 800 g. dichlorodiethyl ether. The mixture is heated to 130–150° C. until all the alkali has been used up. The product is washed with water to remove the sodium chloride and is then distilled under vacuum. Phenoxyethoxyethyl chloride distills from 190–195° C. at 30 mm. pressure.

*Example 2. Phenoxyethoxyethyl acetate.*—A mixture containing 400 g. phenoxyethoxyethyl chloride, 200 g, potassium acetate, and 200 g. glacial acetic acid is heated to boiling (165° C.) for about 12 hours. The product is diluted with alcohol, filtered to remove potassium chloride, and distilled in vacuum. Phenoxyethoxyethyl acetate distills from 175–195° C. at 16 mm. pressure.

*Example 3. Phenoxyethoxyethanol.*—A mixture containing 224 g. of phenoxyethoxyethyl acetate, 300 g. alcohol, and 40 g. sodium hydroxide is refluxed for 6 hours. The solution is distilled to remove the alcohol, filtered to remove sodium acetate, and the resulting product distilled in vacuo. Phenyoxyethoxyethanol distills from 175–185° C. at 20 mm. pressure.

*Example 4. Phenoxyethoxyethyl chlorobenzoylbenzoate.*—A mixture containing 132 g. chlorobenzoylbenzoic acid, 125 g. phenoxyethoxyethanol, 100 g. ethylene dichloride, and 1 cc. sulphuric acid is heated to boiling in an apparatus designed to separate the water from the distillate and to return the organic solvents to the reaction flask. Distillation is continued until the majority of the acid is esterified. The product is washed with sodium carbonate solution until free of acid and then refined by heating to 175° C. at 20 mm. pressure in the presence of decolorizing carbon in order to remove the low boiling material and the color. The filtered product is amber colored.

*Example 5. Phenoxyethoxyethyl butyl phthalate.*—A mixture of 100 g. phenoxyehoxyethel chloride and 130 g. potassium butyl phthalate is heated to 160° C., at which point a vigorous reaction begins and the temperature rises to 180° C. with solid separating out. After reaction ceases the product is cooled and washed with water to remove the salt. The resulting product is refined as in Example 4. The product is phenoxyethoxyethyl butyl phthalate.

*Example 6. Phenoxyethoxyethyl stearate.*—A mixture containing 150 g. stearic acid, 100 g. phenoxyethoxyethanol, 200 g. ethylene dichloride, and 1 g. sulphuric acid is heated to boiling in an apparatus such as described in Example 4 until the majority of the acid has been esterified. The product is refined as in Example 4. The phenoxyethoxyethyl stearate obtained in this manner is light amber colored and melts at about 15° C.

*Example 7. Phenoxyethoxyethyl phthalate.*—A mixture containing 75 g. phthalic anhydride, 190 g. phenoxyethoxyethanol, 100 g. ethylene dichloride, and 1 g. sulphuric acid is heated to boiling in the apparatus described in Example 4 until the majority of the acid has been esterified. The product is then refined as in Example 4. Phenoxyethoxyethyl phthalate is obtained.

*Example 8. Cresoxyethoxyethyl chloride.*—A mixture containing 760 g. orthocresol, 800 g. xylene, and 300 g. sodium hydroxide is heated to 135° C. and then added to 200 g. dichlorodiethylether. The mixture is heated to 130–150° C. until all the alkali is used up. The product is washed with water and then vacuum distilled. Cresoxyethoxyethyl chloride distills between 180–210° C. at 15 mm. pressure.

*Example 9. Cresoxyethoxyethyl benzoate.*—A mixture containing 80 g. potassium benzoate, 61 g. benzoic acid, and 108 g. cresoxyethoxyethyl chloride is heated to 200° C. for one hour with no evidence of reaction. When the temperature reaches 235° C., reaction takes place with the production of potassium chloride. The temperature of the reaction mixture is held at 235–240° C. for one hour, then cooled, washed first with water to remove the potassium chloride, then with sodium carbonate solution to remove benzoic acid, and finally vacuum distilled. Cresoxyethoxyethyl benzoate distills between 235–260° C. at 10 mm. pressure.

*Example 10. Xylyloxyethoxyethyl chloride.*—A mixture containing 620 g. xylenol, 700 g. xylene, and 210 g. sodium hydroxide is heated to about 135° C. and then added to 1600 g. dichlorodiethyl ether. The mixture is warmed until reaction begins, then slowly heated to 130° C. and kept at this temperature until all the alkali has been used up. The product is washed with water and vacuum distilled. Xylyloxyethoxyethyl chloride distills from 170-200° C. at 10 mm. pressure.

*Example 11. Xylyloxyethoxyethyl methoxyethyl adipate.*—A mixture of 200 g. of xylyloxyethoxyethyl chloride and 186 g. potassium acid adipate is heated at 150° C. for 3 hours. The product is dissolved in 200 g. methoxyethanol, and filtered to remove potassium chloride. 4 g. sulphuric acid is added and the mixture heated to boiling in an apparatus as described in Example 4 until most of the acid has been esterified. The product is refined as in Example 4.

The present invention includes within its scope the use, as plasticizers for cellulose derivatives, of the esters of monoaryl ethers of polyglycols, that is, the esters of such alcohols with inorganic acids, for example, hydrochloric, boric, or phosphoric acid, and the esters of such alcohols with organic acids, among which may be mentioned beside those disclosed above, acids such as propionic, butyric, lauric, palmitic, oleic, acrylic, crotonic, quinolinic, nicotinic, diphenic, hexahydrophthalic, eleostearic, and, in fact, aliphatic, aromatic, and heterocyclic, monobasic and polybasic saturated and unsaturated acids in general. In the preparation of the alcohols of the present invention, other phenols than those mentioned may be used, including the naphthols, and the hydroxydiphenyls. The term "aryl" as used in this specification is defined as any univalent aromatic hydrocarbon radical, as phenyl or tolyl, whose free valence belongs to the nucleus and not to a side chain.

The compounds forming the new esters of the present invention are substantially all liquids varying from water white to light amber in color. A few of these compounds, such as phenoxyethoxyethyl stearate are solids of low melting points. They all have high boiling points and low vapor pressures and are compatible to a high degree with cellulose derivatives. They are of particular interest due to their compatibility with cellulose acetate in high ratios. They are readily soluble in the ordinary lacquer solvents.

The following examples are given to illustrate typical coating compositions according to the present invention:

*Example 12*

| | Parts |
|---|---|
| Cellulose nitrate | 12 |
| Damar | 3 |
| Phenoxyethoxyethanol | 4 |
| Castor oil | 2.6 |
| Solvent | 166 |

*Example 13*

| | Parts |
|---|---|
| Cellulose nitrate | 12 |
| Damar | 4 |
| Phenoxyethoxyethyl stearate | 6.6 |
| Solvent | 166 |

*Example 14*

| | Parts |
|---|---|
| Cellulose acetate | 12 |
| Phenoxyethoxyethyl acetate | 6 |
| Solvent | 182 |

*Example 15*

| | Parts |
|---|---|
| Cellulose nitrate | 12 |
| Pigment | 16 |
| Resin | 3½ |
| Oil | 3½ |
| Cresyloxyethoxyethyl benzoate | 4 |
| Solvent | 161 |

*Example 16*

| | Parts |
|---|---|
| Benzyl cellulose | 12 |
| Xylyloxyethoxyethyl methoxyethyl adipate | 3 |
| Solvent | 120 |

*Example 17*

| | Parts |
|---|---|
| Pyroxylin | 10 |
| Resin | 6 |
| Phenoxyethoxyethyl phthalate | 6 |
| Wax | 2 |
| Solvent | 170 |

The above coating compositions give films which dry in a few minutes and which are tough, flexible, and very durable. By the term "solvent" as used in the above examples is to be understood suitable mixtures of esters, alcohols and hydrocarbons, such as will be obvious to those skilled in the art.

The following examples illustrate typical plastic compositions according to the present invention:

*Example 18*

| | Parts |
|---|---|
| Cellulose acetate | 100 |
| Phenoxyethoxyethyl chlorobenzoylbenzoate | 40 |

*Example 19*

| | Parts |
|---|---|
| Cellulose nitrate | 100 |
| Phenoxyethoxyethyl phthalate | 35 |

*Example 20*

| | Parts |
|---|---|
| Ethyl cellulose | 100 |
| Cresoxyethoxyethyl chloride | 15 |

*Example 21*

| | Parts |
|---|---|
| Cellulose acetate | 100 |
| Phenoxyethoxyethyl acetate | 60 |
| Pigment (including color) | 200 |

*Example 22*

| | Parts |
|---|---|
| Cellulose nitrate | 100 |
| Phenoxyethoxyethyl butyl phthalate | 50 |
| Pigment (including color) | 200 |

*Example 23*

| | Parts |
|---|---|
| Cellulose acetate | 100 |
| Cellulose nitrate | 100 |
| Phenoxyethoxyethyl chloride | 90 |

The above plastic compositions may be prepared with or without the usual voltatile solvents, i. e., alcohol for cellulose nitrate compositions, acetone for cellulose acetate compositions and toluol-alcohol for the ether compositions.

All of the above examples are merely illustrative and it is not intended that the invention should be limited to these examples. Other cellulose derivatives may be used, including cellulose propionate, cellulose butyrate, cellulose acetobutyrate, cellulose nitroacetate and benzyl cellulose. The plasticizers in the above examples may be replaced in part by other plasticizers of the group herein disclosed or by plasticizers heretofore known, such as triacetin, camphor, dibutyl phthalate, tricresyl phosphate, and the like.

The plasticizers of the present invention are suitable for the preparation of all types of cellulose derivative compositions. They may be used advantageously in the preparation of lacquers for coating metal and wood, in dopes for coating fabrics, in moisture proof lacquers for coating sheets of regenerated cellulose and in plastic compositions to be used in the preparation of toilet ware, novelties, sheeting, rods, tubes, safety glass interlayers, et cetera.

An advantage of the present invention is that it furnishes extremely high boiling, water-resistant plasticizers for cellulose derivatives. These plasticizers, due to their low vapor pressures, give products of permanent flexibility and great durability. These plasticizers are highly compatible with cellulose derivative compositions and their property in this respect is particularly exceptional with cellulose acetate, being superior in compatibility to most plasticizers heretofore used with cellulose acetate.

The ester ethers above described as plasticizers for cellulose derivatives are esters of aryl ethers of poly polyhydric alcohols, a poly polyhydric alcohol being an ether in which the ether oxygen links two similar or different hydroxylated hydrocarbon radicals. These esters of aryl ethers of poly polyhydric alcohols are in general of use as plasticizers for cellulose derivatives. As examples of these aryl ether alcohols and aryl ether esters may be cited the mono-, di-, and tri-phenyl, cresyl, anisyl, naphthyl, et cetera, ethers of diglycerol, triglycerol, disorbitol, dipentaerythritol, et cetera, and the esters thereof with organic or inorganic acids.

As many apparently widely different embodiments of this invention may be made without departing from the spirit and scope thereof, it is to be understood that the invention is not limited to the specific embodiments thereof except as defined in the appended claims.

I claim:

1. A composition comprising a cellulose derivative and an ester of a monoaryl ether of a polyglycol with an organic acid.

2. A composition comprising a cellulose derivative and an ester of an aryloxyethoxyethanol with an organic acid.

3. A composition comprising a cellulose derivative and an ester of phenoxyethoxyethanol with an organic acid.

4. A composition comprising a cellulose derivative and, as a plasticizer therefor, an ester of a monoaryl ether of a polyglycol with an organic acid from the group consisting of fatty acids having from 2–18 carbon atoms, inclusive, phthalic, benzoic, chlorobenzoylbenzoic, and adipic acids.

5. A composition comprising a cellulose derivative and, as a plasticizer therefor, an ester of an aryloxyethoxyethanol with an organic acid from the group consisting of fatty acids having from 2–18 carbon atoms, inclusive, phthalic, benzoic, chlorobenzoylbenzoic, and adipic acids.

6. A composition comprising a cellulose derivative and, as a plasticizer therefor, an ester of phenoxyethoxyethanol with an organic acid from the group consisting of fatty acids having from 2–18 carbon atoms, inclusive, phthalic, benzoic, chlorobenzoylbenzoic, and adipic acids.

7. A composition comprising cellulose acetate and, as a plasticizer therefor, an ester of a monoaryl ether of a polyglycol with an organic acid.

8. A composition comprising cellulose acetate and, as a plasticizer therefor, phenoxyethoxyethyl acetate.

9. A composition comprising a cellulose nitrate and, as a plasticizer therefor, an ester of a monoaryl ether of a polyglycol with an organic acid.

10. A composition comprising cellulose nitrate and, as a plasticizer therefor, phenoxyethoxyethyl phthalate.

11. A composition comprising a cellulose derivative and, as a plasticizer therefor, an organic acid ester of an aryl ether of a poly polyhydric alcohol.

12. A composition comprising ethyl cellulose and as a plasticizer therefor an ester of a monoaryl ether of a polyglycol with an organic acid.

13. A composition comprising ethyl cellulose and, as a plasticizer therefor, phenoxyethoxyethyl adipate.

EMMETTE F. IZARD.